United States Patent [19]

Schenten

[11] Patent Number: 4,650,258

[45] Date of Patent: Mar. 17, 1987

[54] REAR SPRING ACTUATED BRAKE PROPORTIONER

[75] Inventor: James L. Schenten, Stering Heights, Mich.

[73] Assignee: Chrysler Motors Corporation, Highland Park, Mich.

[21] Appl. No.: 809,087

[22] Filed: Dec. 16, 1985

[51] Int. Cl.⁴ .............................. B60T 8/18; B60T 13/00
[52] U.S. Cl. ................................. 303/22 R; 303/6 C
[58] Field of Search .................. 303/22 R, 23 R, 6 C, 303/6 M; 188/195, 349

[56] References Cited

U.S. PATENT DOCUMENTS

| | | | |
|---|---|---|---|
| 2,498,438 | 2/1950 | Levesque | 188/195 |
| 2,523,057 | 9/1950 | Ransom | 188/195 |
| 3,149,886 | 9/1964 | Dorner | 303/22 R |
| 3,199,928 | 8/1965 | Chouings | 303/22 R |
| 3,442,557 | 5/1969 | Oberthur | 303/22 R |
| 3,460,871 | 8/1969 | Keller et al. | 303/22 R |
| 3,512,845 | 5/1970 | Farmery et al. | 303/22 R |
| 3,684,329 | 8/1972 | Kawabe et al. | 303/22 R |
| 3,884,532 | 5/1975 | Deschenes | 303/22 R |
| 3,927,916 | 12/1975 | Masuda | 303/22 R |
| 3,936,097 | 2/1976 | Yanagawa et al. | 303/22 R |
| 3,975,062 | 8/1976 | Giordano | 303/22 R |
| 4,012,079 | 3/1977 | Takeshita | 303/6 C |
| 4,060,283 | 11/1977 | Demido et al. | 303/6 C |
| 4,090,740 | 5/1978 | Farr | 303/22 R |
| 4,111,495 | 9/1978 | Peeples | 303/6 C |
| 4,150,855 | 4/1979 | Demido | 303/22 R |
| 4,325,581 | 4/1982 | Pickering | 303/22 R |
| 4,445,725 | 5/1984 | Sivulka | 303/6 C |

FOREIGN PATENT DOCUMENTS

| | | | |
|---|---|---|---|
| 2800122 | 7/1979 | Fed. Rep. of Germany | 303/22 R |
| 957,878 | 5/1964 | United Kingdom | 303/22 R |

Primary Examiner—Andres Kashnikow
Assistant Examiner—Robert J. Oberleitner
Attorney, Agent, or Firm—Kenneth H. MacLean, Jr.

[57] ABSTRACT

An improved brake proportioning system, particularly for a vehicle such as a truck, subject to relatively large differences in loading, includes a force responsive proportioning valve inserted between a master brake cylinder and the rear brakes of the vehicle for increasing the rear braking effort relative to the front braking effort as the vehicle load increases. A device which senses the position of the rear spring of the vehicle operably connected to the force input of the proportioning valve by responding to angular movements of the pivotally mounted end portion of the rear leaf spring whereby spring flexure due to changes in vehicle load produce a corresponding input force to the proportioning valve.

7 Claims, 10 Drawing Figures

REAR SPRING ACTUATED BRAKE PROPORTIONER

CROSS REFERENCES TO RELATED APPLICATIONS

This application describes an improved rear brake proportioner and discloses some information also found in U.S. application Ser. No. 06/686,359 which was filed on Dec. 26, 1984, and entitled "Rear Spring Actuated Brake Proportioner" and now U.S. Pat. No. 4,583,789 which issued on Apr. 22, 1986. The claimed invention in this application is limited to improvements not disclosed in Ser. No. 06/686,359. The sole inventor of this application is also the sole inventor of the earlier application.

BACKGROUND OF THE INVENTION

1. This invention relates to vehicle hydraulic brake systems and, more particularly, to a hydraulic brake system utilizing a proportioning valve which responds to the load of the vehicle to vary the braking effort produced by the rear wheel brake components.

2. Prior use of a rear brake proportioning valve in a hydraulic braking system include the 1984–1985 Chrysler Corporation built T-115 Van and Wagon, sold under the names: Plymouth "Voyager" and Dodge "Minivan" or "Caravan." In these vehicles, a proportioning valve in the hydraulic brake system is mounted to a body member slightly forward of the rear axle and slightly to the left of the vehicle center line. A connector assembly is attached to the rear axle rightwardly of the proportioning valve. The connector includes an elongated tension type spring extending between the axle and the input of the proportioning valve. When the vehicle is lightly loaded, the relative positions of the axle and the proportioning valve produces a relatively slight extension of the spring. As the vehicle load increases, particularly near the rearward portion of the vehicle, the extension of the tension spring is increased as the vehicle body moves downward with respect to the axle. Resultantly, the spring exerts an increased force input on the proportioning valve which results in the valve directing an increased brake fluid pressure to the brake components of the rear wheels for greater rear braking effort.

The aforedescribed brake system operates quite satisfactorily. However, the mid-axle location of the valve and connector assembly is not always convenient on other vehicles due to space considerations and interference with the body and other components. Also, a spare tire stored immediately to the rear of the brake proportioning components and the above described arrangement results in crowding. It would be desirable to locate the brake proportioning components elsewhere to permit better accessibility of the spare tire and greater flexibility in available spare tire dimensions.

The subject invention which is described in more detail hereinafter concerns an improved hydraulic brake system with a relocated proportioning valve responsive to vehicle loading. The proportioning valve and related components are relocated to a more desirable position in front of the rear suspension spring. Therefore, other means are provided to sense and transmit vehicle loading.

The above identified Chrysler Corporation brake system is generally related to the subject invention. Other related patents are discussed hereinafter. U.S. Pat. Nos. 4,150,855 and 4,325,581 relate to a load responsive brake proportioning valve for brake systems, but are specifically designed for use with coil type suspension springs of a vehicle. In both of the devices, the brake proportioning device is configured and arranged to be mounted mostly within the central portion of the coil spring of the vehicle suspension. Both devices receive force inputs directly from the suspension spring through levers 64 and 66 in the '855 patent and through resilient or elastomeric members in the '581 patent.

U.S. Pat. No. 3,975,062 discloses a device responsive to vehicle deceleration for modifying brake action. The deceleration valving device is connected by linkage to an anti-roll bar to respond to suspension related conditions of the vehicle.

U.S. Pat. Nos. 2,498,438; 3,460,871; 3,884,532; and 4,012,079 disclose brake proportioning systems using a proportioning valve responsive to movement of a suspension spring, particularly of the leaf type construction commonly used in association with the rear axle of a vehicle. In addition, the British Pat. No. 957878 assigned to Daimler-Benz discloses a brake proportioning system utilizing a lever pivoted at its midpoint with a first arm connected to an end portion of the leaf spring and with a second arm operating a fluid valve.

There are other brake proportioning devices which are generally relevant to the subject application. The following U.S. patents are in this category: Nos. 2,523,057; 3,149,886; 3,199,928; 3,512,845; 3,684,329; 2,927,916; 3,936,097; 4,060,283; 0,090,740; and 4,445,725. A common feature of these patents is a brake modifying device directly responsive to axle position. It is not believed that these patents are more relevant to the subject invention of this application than the above-described Chrysler system utilized on the T-115 vehicle.

SUMMARY OF THE INVENTION

It is desirable to locate a brake proportioning valve in a protected location. Such a location is found just forward of the rear wheel and adjacent the forward end portion of the rear leaf type suspension spring. At this location, the forward end of the leaf spring is pivotally connected to the sprung portion of the vehicle. In the subject application, the brake proportioning valve is mounted on the sprung portion of the vehicle or, specifically, on a longitudinal chassis member. The proportioning valve includes related input means which sense vehicle loading via the angular position of the adjacent spring end. Thus, as the vehicle load increases, the spring end pivots through an arc as the sprung portion of the vehicle moves downward with respect to the mid-portion of the spring which is maintained a substantially constant distance relative to the road surface.

The subject input means for the proportioning valve includes a spring position or follower member which engages the end portion of the leaf spring a short distance from the pivotal support of the leaf spring. Thus, the follower is moved as the spring angulates caused by loading of the vehicle. The follower member is connected to the force input of the proportioning valve by an extended spring-like axial connector. As the follower pivots in response to loading of the vehicle, the force input on the proportioning valve is changed via the connector. The follower is desirably maintained in close contact with the end portion of the leaf spring by a yieldable control device which also contacts the end portion of the leaf spring.

Consequently, an object of the invention is to provide an improved vehicle brake proportioning system including a load responsive input means for a proportioning valve which directly senses angular movements of the vehicle rear leaf type suspension spring.

A further object of the invention is to provide an improved vehicle brake proportioning system utilizing load responsive input means to a proportioning valve which input means is moved by pivotal action of the leaf type rear suspension spring as the vehicle load changes. The resultant positioning of the load responsive input means exerts a force input to one end of an axially yieldable, spring-like connector, the other end of which directs an input force on the proportioning valve.

Other objects and advantages of the subject invention will be more readily apparent from a reading of the following Detailed Description of Preferred Embodiments, which are shown in the following drawings.

BRIEF DESCRIPTION OF THE DRAWINGS

FIG. 8 is an enlarged partially sectioned view of the follower lever taken along section lines 8—8 in FIG. 6 and looking in the direction of the arrows; and FIG. 9 is an enlarged partially sectioned view taken along section lines 9—9 in FIG. 6 and looking in the direction of the arrows.

DESCRIPTION OF THE PREFERRED EMBODIMENTS

Figure 1:
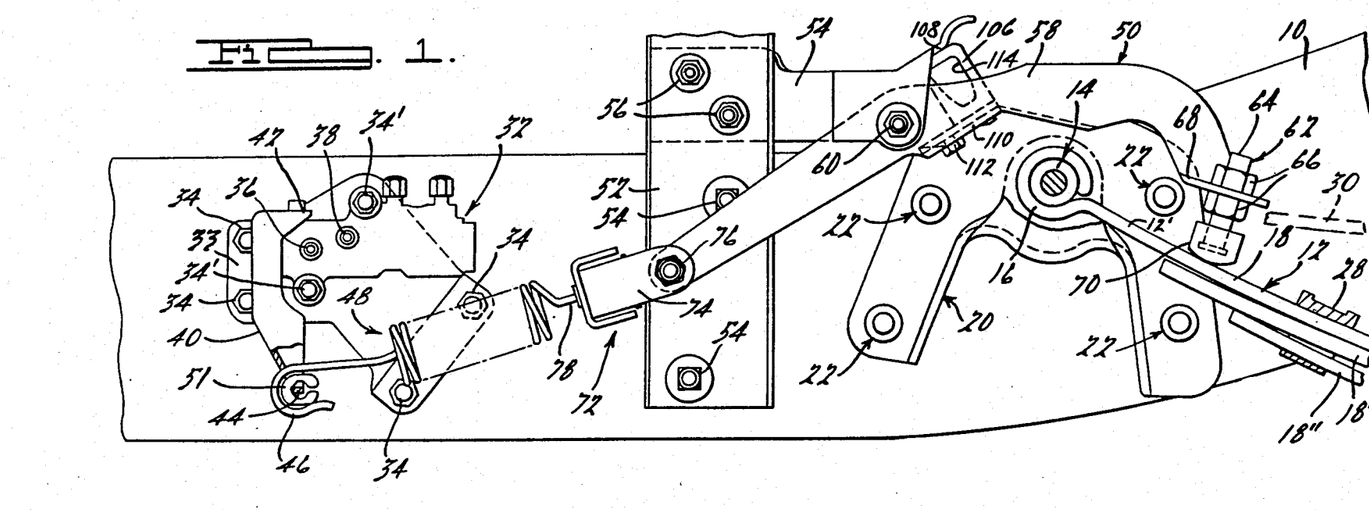
FIG. 1 is a partial elevational view of a vehicle frame member supporting a proportioning valve and suspension spring end with associated load sensing equipment.
Figure 1A:
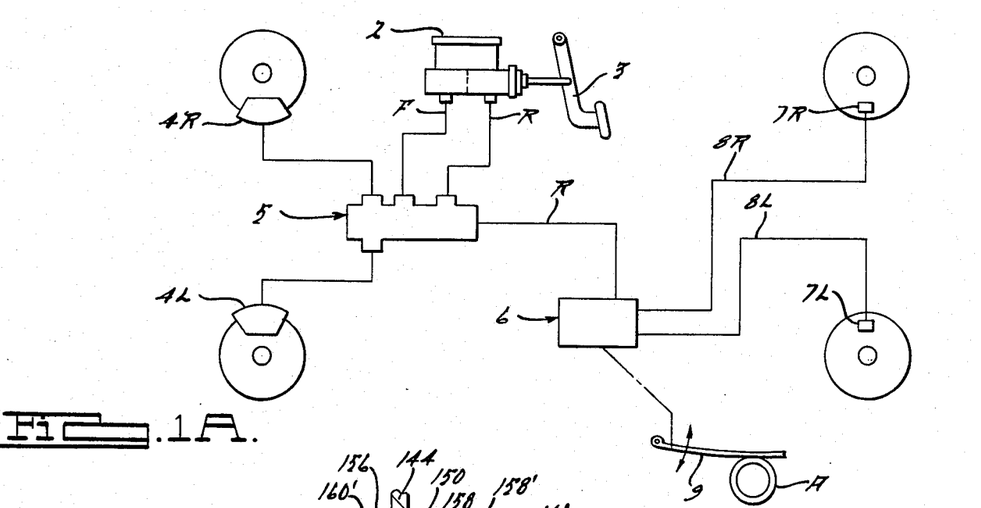
FIG. 1A is a schematic view of the subject vehicle hydraulic brake system showing the proportioning valve.

In FIG. 1A, a somewhat schematic representation of the subject vehicle hydraulic brake system is illustrated. A master brake cylinder 2 receives a braking input from a vehicle operator via pedal 3 to generate brake activating hydraulic fluid pressure. The fluid pressure is transmitted by means of conduit F to the vehicle front wheel brakes 4L and 4R. The fluid pressure first passes through a metering valve assembly, details not shown, contained in a combination valve 5. The master cylinder 2 and combination valve 5 are conventional braking components found in modern day automobiles. Likewise, the numerals 4L and 4R label disc type brake actuators including cylinders with power pistons therein (not shown) which are of a conventional design commonly used in modern automobiles.

A conduit R similarly provides a source of brake activating fluid pressure to a proportioning valve assembly 6 in FIG. 1 (shown schematically). The proportioning valve 6 supplies brake activating fluid pressure to the vehicle rear wheel brakes 7R and 7L through conduits 8R and 8L, respectively. The proportioning valve 6 is a known device which has been previously used on automobiles for the purpose of changing the brake effects of the rear wheel brake components relative to the front brakes as desired. In the subject improved brake system, the proportioning valve 6 is responsive to vehicle loading by means of sensing the angular position of the end portion 9 of a rear leaf type suspension spring.

The forward end portion 9 of the leaf type suspension spring is pivotally mounted to a sprung portion of the vehicle as shown in FIG. 1. The spring is contacted by the vehicle axle A at a midpoint of the spring. Changes in vehicle loading, particularly adjacent the rear axle, cause the sprung portion of the vehicle to move vertically relative to the axle A. With increased loading of the vehicle, the sprung portion and the connected spring end will move downward with respect to axle A and, thus, cause the end portion to flex in a counterclockwise manner as shown in FIG. 1A. When the vehicle load is decreased, the sprung portion of the vehicle will move the spring end 9 upward with respect to the axle A and thereby cause the end portion 9 to move angularly clockwise as shown in FIG. 1A. The subject improved braking system provides an input to the proportioning valve 6 in response to these angular positions of the leaf spring as characterized by the broken line operatively connecting the end portion of the spring to the proportioning valve.

Figure 2:
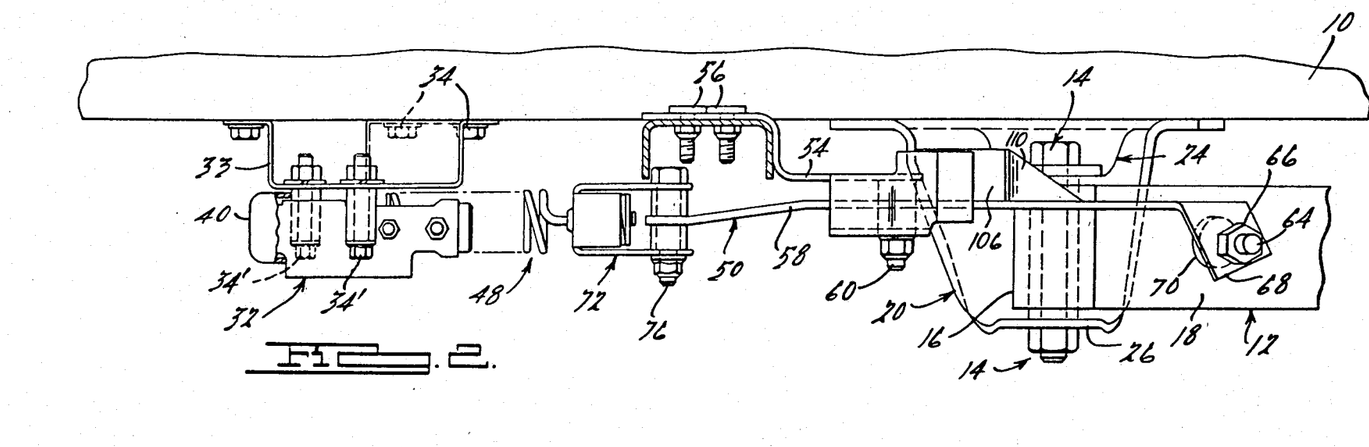
FIG. 2 is a partial planar view of the component shown in FIG. 1.

In FIGS. 1 and 2, a longitudinally extending (fore and aft) vehicle frame member 10 is illustrated. That portion of frame 10 which is illustrated is forward of the rear axle (not shown). The rear axle is attached to the vehicle by springs of leaf type construction. A forward end portion 12' of the leaf spring assembly 12 is shown in FIG. 1. The forward end portion 12' is formed into a loop and is pivotally supported by a fastener means 14. The fastener means 14 extends through an eye portion or the loop 16 formed in the end of the uppermost leaf 18 of the spring assembly 12. The fastener 14 extends between spaced portions of bracket means 20 which is attached to the frame member 10 by fasteners 22. Specifically, the bracket means 20 includes a wall portion 24 which is outwardly offset from the frame member 10 and which engages one end of the fastener 14. Another outwardly offset wall portion 26 supports the other end of the fastener 14.

The leaf spring assembly 12 is commonly utilized in rear suspensions of front and rear-wheel drive type vehicles. The spring 12 includes the uppermost or main leaf 18 and also auxiliary leaf members, such as 18' and 18" which extend substantially the length of the leaf spring, but are not necessarily directly fastened to the frame member 10. The leaf portions 18, 18', 18" of the assembly 12 are secured together by band or clamp means 28, as well as by a clamping (not shown) to the axle near the center of the leaf spring assembly. This is conventional in many vehicle rear suspensions. As is well known, an increased load or cargo in vehicles causes the sprung weight, such as frame 10, and the attached end portion 12' to move downward with respect to the mid-portion of the spring which is attached to the axle. For example, the spring end 12' is shown in a lightly loaded arcuate shape in FIG. 1. As the vehicle load is increased, the spring 18 is straightened and a fully loaded position of the spring 18 is identified by numeral 30 in FIG. 1.

As previously indicated, it is desirable to provide brake proportioning in vehicles which are subject to relatively large variations in loading. The proportioning system produces decreased braking capacity of the rear wheels when the vehicle is lightly loaded and increased braking capacity when the vehicle load is increased. As shown in FIGS. 1 and 2, a brake proportioning valve assembly 32 is mounted on the frame member 10 in a position forward of the spring assembly 12. Specifically, the brake proportioner 32 is attached to a bracket 33 by fasteners 34'. Bracket 33 is attached to frame member 10 by fasteners 34. Valve 32 includes a brake fluid inlet 36 to receive pressurized fluid from the combination valve 5 and the master brake cylinder 2 of the vehicle as shown in FIG. 1A. It also includes fluid outlet conduit means 8R and 8L directed to the right and the left wheel cylinder assemblies 7R and 7L.

Brake proportioning valves similar to assembly 32 have been utilized on vehicles previously. The interior parts and function thereof is known. Basically, the brake proportioner valve is an input force responsive device having valve components for regulating fluid pressure to each of the rear wheel brake cylinders 7R and 7L. The fluid pressure received through the valve inlet is regulated thereby and directed to the rear wheel cylinders of the vehicle brake system. A lever-like input actuator 40 is pivotally attached at its upper end 42 to one corner of the valve 32 where it may pivot thereabout. A lower portion 44 of lever 40 is operably connected by a hooked end portion 46 to a spring connector 48. Spring connector 48 extends from the lever end 44 to a rear suspension spring follower assembly 50. To promote smooth engagement between the hooked end portion 46 and the lever end 44, a contoured sleeve member 51 is utilized therebetween.

As previously indicated, the connector 48 extends between lever 40 and a spring position follower 50 as illustrated in FIGS. 1 and 2. The position follower 50 is supported by a bracket 52 which extends upwardly from frame member 10. It is attached thereto by fasteners 54. The upper portion of member 52 supports a horizontal bracket 54 which is fastened thereto by fasteners 56. The bracket 54 supports an elongated spring position lever 58. Lever 58 is pivotally supported at a central position on bracket 54 by a fastener 60. The rearwardly directed end portion or arm of lever 58 (to the right in FIGS. 1,2) supports an adjustable spring contact assembly 62. Assembly 62 includes a threaded shaft 64 with nut-type fasteners 66 on either side of a turned end portion 68 of the lever. The fasteners 66 capture the threaded member 64 in a desired axial positioning relative to lever 58 and spring leaf 18. The lower end of the threaded shaft 64 has an elastomeric cup or spring contact member 70 thereon which engages the spring. Movement of the spring end 12' causes the lever 58 to be pivoted about the axis of fastener 60.

The forward end or arm (to the left) of the lever 58 is connected to spring assembly 48. More specifically, a caged spring assembly 72 is interposed therebetween. The spring assembly 72 includes a generally "U" shaped body 74 pivotally attached to the end of the lever 58 by a fastener 76. An end portion 78 of the spring 48 extends into and is connected to body 74 of spring assembly 72. For more details of this assembly, reference is hereby made to FIG. 3. The caged spring assembly 72 includes the generally "U" shaped member 74 whose legs are pivotally attached to the lever 58 by fastener 76. Specifically, fastener 76 extends through a cylindrical sleeve 80 supported on the end of lever 58. The mid-portion 82 of fastener 76 is of enlarged diameter so that a relatively great cylindrical surface bearingly engages sleeve 80.

Figures 3, 4:
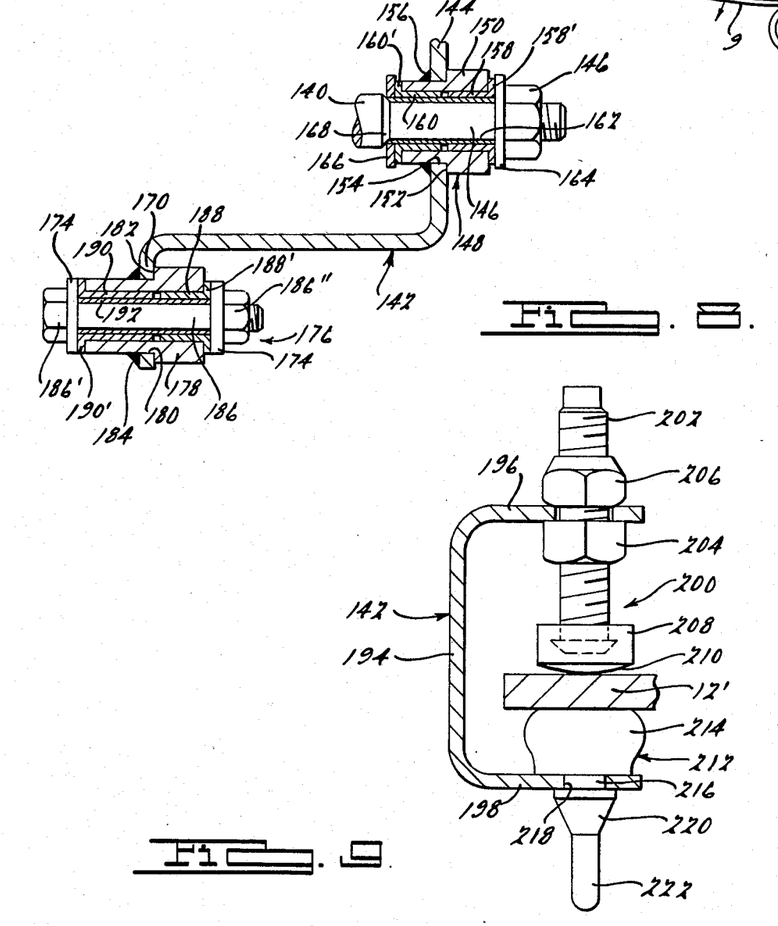
FIG. 3 is an enlarged sectioned view of a connecting means between the load sensing component and the proportioning valve shown in FIGS. 1 and 2.
FIG. 4 is an enlarged sectioned view of a modified form of the connector shown in FIG. 3.
Figure 3:
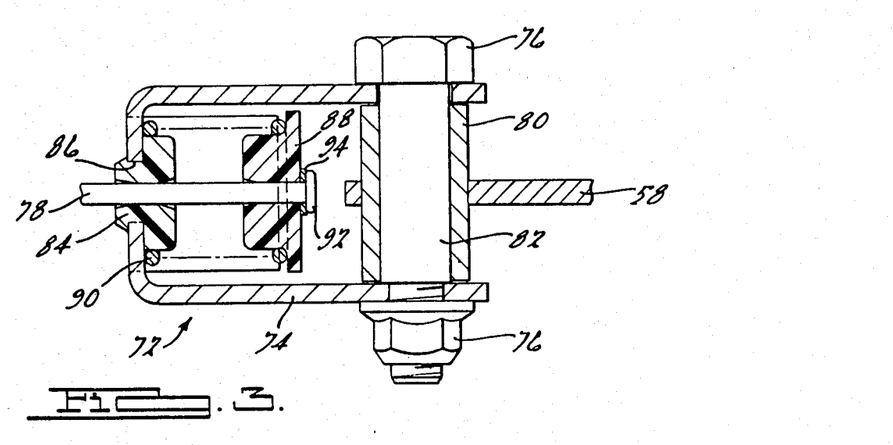
Figure 4:
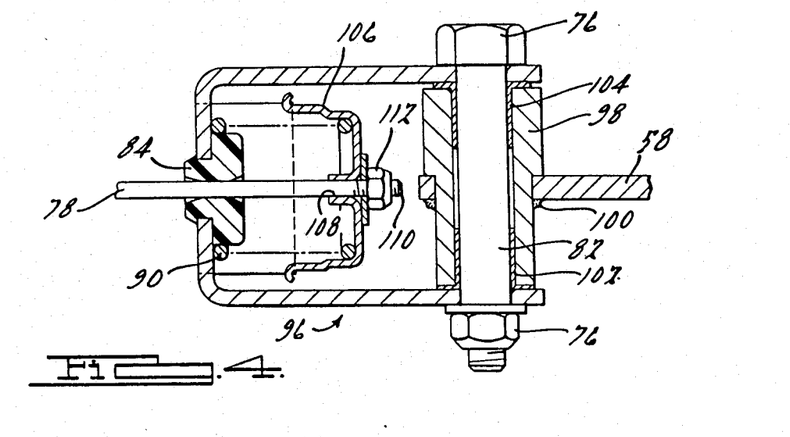

The end 78 of spring assembly 48 projects through a bushing 84 which is supported in an opening 86 of housing 74 and then extends centrally through a spring 90 and then through a second retainer member 88. The retainer 84 and 88 engage the ends of the spring 90. The end portion 92 of the spring 78 is so formed that rightward movement of retainer 88 due to the influence of spring 90 is prevented. Also, a small annular bearing member 94 is placed between the end 92 and the retainer 88.

In FIG. 4, a functionally similar caged spring assembly 96 is illustrated. Again, lever 58 supports a tubular bushing or sleeve member 98 which is retained thereto by weld 100. The central portion 82 of the retainer 76 is encircled by two frictionreducing sleeves 102, 104. As in FIG. 3, the spring end portion 78 extends through a retainer member 84 and then axially through a spring 90. The other end of spring 90 is retained by a generally cup-shaped retainer 106 including a central bore 108 formed therein. The threaded end portion 110 secures the member 106 by a nut-type fastener 112 thereon.

Figure 5:
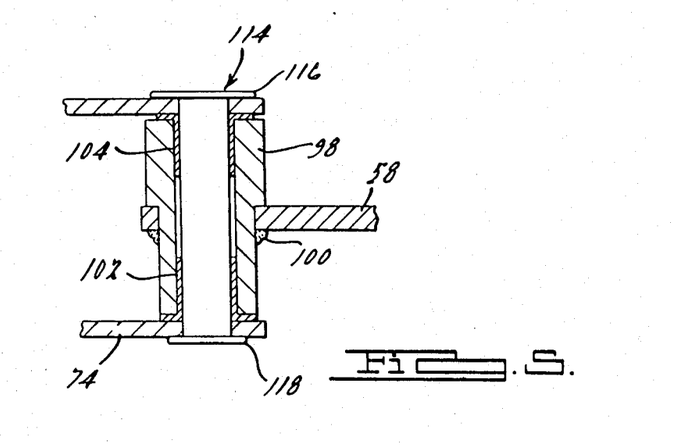
FIG. 5 is an enlarged sectioned view of another modification of the connector shown in FIG. 3.

FIG. 5 illustrates a modification to the device of FIG. 4, particularly in the pivotal connection between lever 58 and the spring assembly. Specifically, the bolt type fastener shown in FIGS. 3 and 4 is replaced by a rivet-type connector 114 with flattened ends as at 116 and 118 which extend over the housing member 74 of the assembly. As in the embodiment shown in FIG. 4, the connection utilizes a sleeve identified by the numeral 98 which is attached by a weld 100 to the lever 58. Like the embodiment of FIG. 4, two friction reducing members 104 and 102 are utilized.

Figure 6:
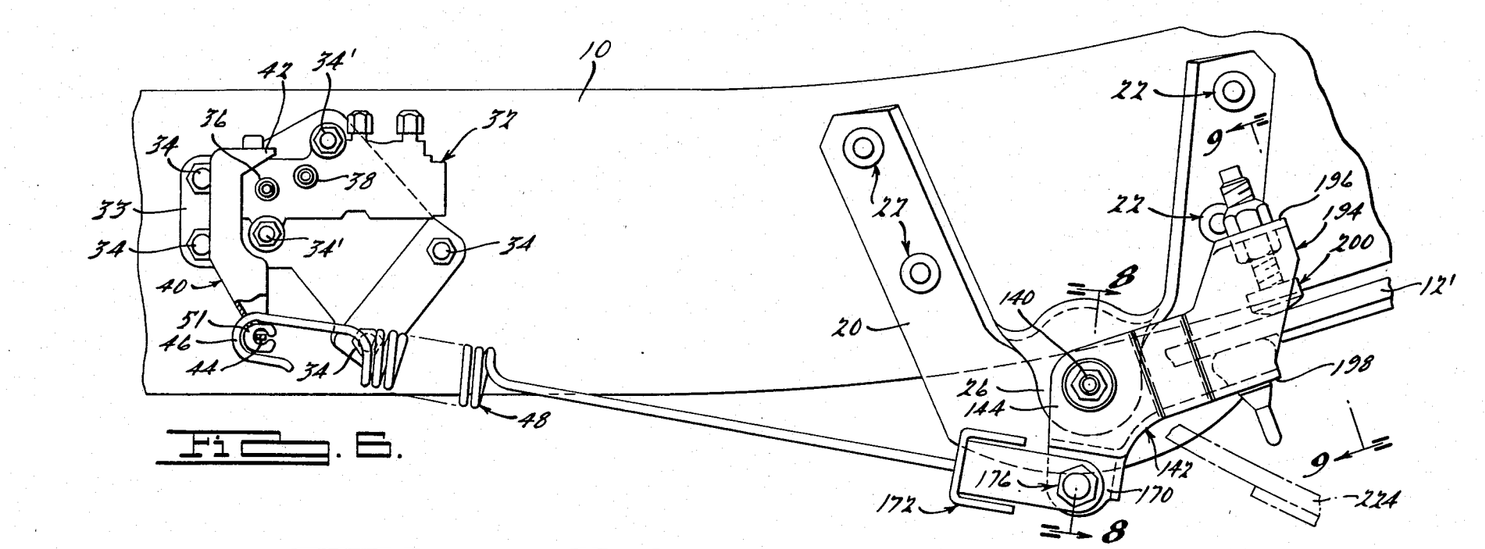
FIG. 6 is a partial elevational view similar to FIG. 1 and showing a modified load sensing device.
Figure 7:
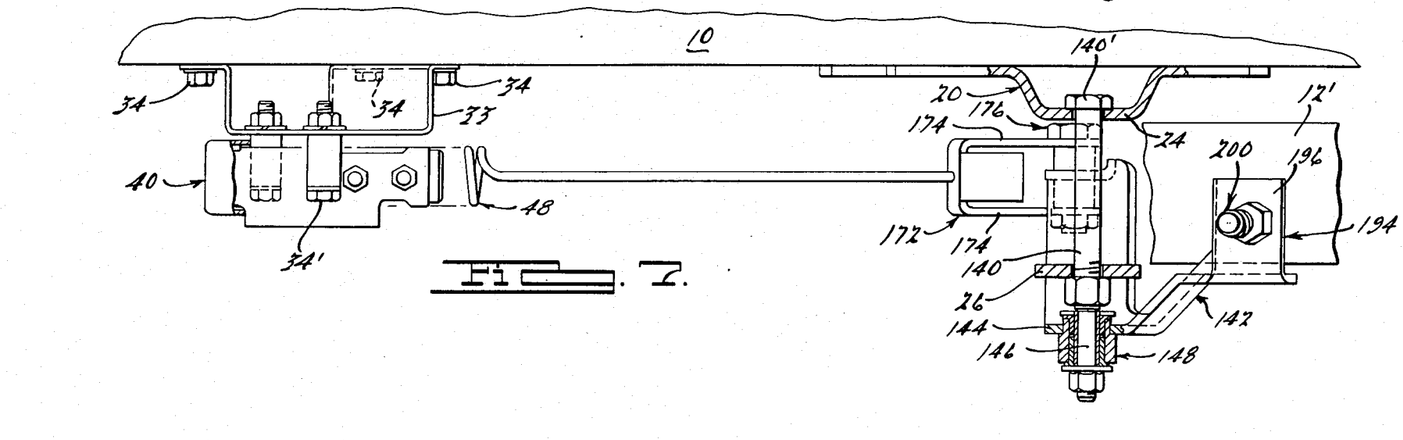
FIG. 7 is a partial planar view similar to FIG. 2 of the modified load sensing device in FIG. 6.

In FIGS. 6 and 7, a second embodiment of the brake proportioning system is illustrated. Many of the components in FIGS. 6 and 7 are identical to the components illustrated in the embodiment shown in FIGS. 1 and 2. Therefore, when the components are the same, the same reference numerals are utilized. A portion of frame member 10 is shown forward of the rear axle (not shown). The rear axle is supported by a spring of leaf type construction with a forward end portion 12' of the leaf spring assembly visible. The end portion 12' is pivotally supported by a fastener means 140 which extends through an end eye portion of the spring 12'. As best shown in FIG. 7, the fastener 140 extends between the spaced portions of the bracket means 20 which is attached to the frame member 10 by a plurality of fasteners 22. Specifically, the bracket means 20 includes a wall portion 24 which is outwardly offset from the frame member 10 and which engages one end 140' of the fastener 140. Another outwardly offset wall portion 26 is spaced substantial lateral distance from the frame member 10 and contacts the fastener 140.

The leaf spring assembly has been described heretofore and will be only briefly summarized again. The spring assembly is commonly utilized in the rear suspension of front and rear wheel drive type vehicles. The spring's forward end portion 12', visible in FIGS. 6 and 7, is pivotally supported to the sprung portion of the vehicle, namely frame member 10. Likewise, the rearward end portion (not shown) of the spring is similarly supported by the sprung portion of the vehicle. Both the forward and rearward connections to the sprung portion of the vehicle are pivotal to permit the sprung portion to move relative to the mid-portion of the spring in a vertical direction. The mid-portion of the spring is fixed to a rear axle which, of course, is operably connected to the rear wheels including the rear brake components as is conventional in automobiles. It is known that an increased load or cargo weight placed in the vehicle causes the sprung weight or the frame 10, as well as the pivotally attached end portions of the spring, to move downward with respect to the fixed central portion of the spring attached to the axle. In FIG. 6, the end portion 12' is depressed a substantial amount as evidenced by the upwardly convex shape of the spring. This suspension configuration represents a relatively heavily loaded condition of the associated vehicle.

It is desirable to utilize brake proportioning in the vehicle and, especially, in vehicles which are subject to relatively large variations in loading. The proportioning system directs a substantially decreased rear braking capacity of the rear brake components when the vehicle is lightly loaded. The rear wheel braking effort is increased as the vehicle load increases. As shown in FIGS. 6 and 7, a brake proportioning valve 32 is shown mounted to the frame member 10 in a position forward of the spring end 12'. Specifically, the brake proportioner 32 is fastened to a bracket 33 which itself is attached to the frame member 10 by a plurality of fasteners 34. The proportioning valve 32 includes a fluid inlet 36 to receive pressurized brake fluid from the combination valve 5 and master cylinder 2 of the vehicle. It also includes right and left outlets 38R and 38L directed to the right and left wheel cylinder assemblies.

As indicated previously, vehicle brake proportioning valves have been utilized previously. The interior of the brake proportioning valve is known. Basically, the brake proportioning valve is an input force responsive device having interior valve components. The brake fluid pressure received at the inlet is regulated and directed to the rear wheel cylinders 7R and 7L of the vehicle brake system. A lever-like input actuator 40 of the proportioning valve 32 is illustrated in FIGS. 6 and 7. The actuator 40 is pivotally attached at its upper end portion 42 to one corner of proportioning valve 32. A lower end portion 44 of input lever 40 is operably connected by hooked end portion 46 to a spring-like connector 48. The spring-like connector 48 extends from the lower end 44 of the input lever 40 to a suspension spring follower mechanism 142. For the purpose of ensuring smooth engagement between the hooked end portion 46 of the spring connector 48 and the lower end 44 of lever 40, a contoured sleeve member 51 is utilized therebetween.

As previously stated, the connector 48 extends between input lever 40 and spring follower 142. The spring follower 142 is a stamped metal member with a midportion 144 which is pivotally mounted about an axially extended portion 146 of the fastener 140. As best shown in FIG. 8, the portion 146 of fastener 140 has a reduced diameter as compared to the remainder and has a threaded end on which a nut fastener 148 is secured. The portion 146 extends through a bushing assembly 148 which includes apertured metal sleeve member 150 as shown in FIG. 8. The sleeve 150 is configured with an enlarged diameter end or head portion forming a shoulder 152 which rests against the mid-portion surface 144 of the position follower. A smaller diameter portion of the sleeve 150 extends through an aperture 154 in the follower's mid-portion 144. The sleeve 150 is secured to the position follower by a braze or weld identified by numeral 156. A pair of generally cylindrically shaped bearing members 158 and 160 extend into the sleeve's internal aperture and include radially extending end portions 158' and 160' which partially overly the ends of the sleeve 150. A thin cylinder 162 of low friction material is placed within the bore formed by the members 158 and 160 and around the portion 146 of the fastener. The sleeve 150 is axially secured to the fastener 140 by means of the aforementioned nut 146 which bears against washer 164 which, in turn, bears against end face 158'. This arrangement produces leftward bias of the sleeve 150 and position follower 142 to urge engagement between a washer 166 against an inclined shoulder portion 168 of the fastener 140. The aforementioned components support the position follower 142 for low friction pivotal movement about the common axis of fastener 140 and the reduced diameter portion 146 thereof.

The spring follower member 142 also includes a downwardly and inwardly (toward member 10) projecting arm 170 relative to mid-portion 144. The arm 170 is operably connected to a caged spring assembly 172 best shown in FIGS. 6 and 7. Specifically, the caged assembly 172 includes a U-shaped body member with legs 174 thereof which are pivotally attached to the arm 170 by means of a bolt and nut fastener 176.

Referring again to FIG. 8, details of the connection between legs 174 and the arm 170 are more apparent. Specifically, an apertured sleeve member 178 similar to the previously described sleeve 150 is utilized. A smaller diameter portion of the sleeve 178 extends through an aperture 180 in arm 170. An enlarged portion of the sleeve 178 forms a shoulder 182 which bears against the surface of arm 170. A braze or weld 184 joins the sleeve 178 to the arm 170. The mid-portion 186 of fastener 176 extends through a pair of tubular bearing members 188 and 190 and cylinder 192 of low friction material. The legs 174 of the caged assembly 172 are secured against the end faces 188' and 190' by the fastener's head portion 186' and nut retainer 186''. The aforedescribed connection of the leg portions 174 to arm 170 provides a low friction pivotal arrangement.

The spring follower assembly 142 also includes a second arm portion 194 which extends rearwardly from the mid-portion 144. The second arm portion 194 includes a pair of extensions 196 and 198 turned normally from the plane of arm 194 and extending in spaced relation to one another. The extensions 196 and 198 are so configured and spaced so that one extends in parallelism above the surface of the spring end 12' and, likewise, one extends beneath the surface of the spring end 12'. The upper extension 196 supports a spring contact means 200, best shown in FIG. 9. The spring contact means 200 includes an elongated threaded body member 202 which is axially adjustably attached to extension 196 by means of a pair of nut fasteners 204 and 206. The fasteners 204 and 206 are moved toward one another to capture the extension 196 therebetween when body 202 is in a desirable axial location relative to spring end 12'. The lower end of the body member 202 carries a spring contacting member 208 which has a curved contact surface 210 to engage the upper surface of the spring end portion 12'.

The lower extension 198 of arm 194 is in parallelism with the upper extension 196 and extends beneath spring end 12'. Extension 198 supports an elastomeric bumper member 212 having a generally bulb shaped portion 214 which engages the lower surface of the spring end 12'. A depending neck portion 216 of bumper 212 extends through an aperture 218 in extension 198 and has an enlarged portion 220 which bears against the lower surface of extension 198 to secure the bumper member 212 to the extension. The narrow stem portion 222 of the bumper is for the purpose of installing the bumper 212. It is inserted through the aperture 218 which then pulls the enlarged portion 220 through the aperture to seat neck portion 216 in aperture 218.

It can be readily understood that the nut fasteners 204 and 206 can be adjusted on body 202 to move the contact 208 against the upper surface of the spring end portion 12'. A desired relationship therebetween exists when the head portion 208 presses against the spring end 12' sufficiently so that the elastic bulb or head portion 214 of the bumper 212 is compressed and flattened slightly. This relationship to the upper and lower surfaces of the spring end 12' enables the spring follower mechanism 142 to track vertical movements of the spring end 12' as it moves due to changes in vehicle loading and due to dynamic fluctuations.

An advantageous feature of the second embodiment shown in FIGS. 6 and 7, as opposed to the first shown in FIGS. 1 and 2, is the coaxial arrangement between the portion 140 which supports spring end 12' and the reduced diameter portion 146 which supports the pivotal spring follower 142. This coaxial arrangement allows identical pivotal movements between the spring end portion 12' and the spring position follower 142. Resultantly, the contact surface 210 of head 208 is not forced to slide on the upper surface of the spring end 12' as the spring end moves angularly. In addition, the bulb portion 214 of bumper 212 does not slide on the bottom surface of the spring end portion 12'. As a consequence, the surfaces which contact the spring end 12' are not subject to any substantial amount of wear as the spring end 12' moves angularly due to encounters of the rear wheels with road irregularities such as bumps and potholes.

OPERATION OF THE BRAKE PROPORTIONER

When a vehicle such as a truck is lightly loaded, vehicle braking is more efficient when the front brakes assume a larger share of the braking capacity. Conversely, when a vehicle is more heavily loaded, increased braking efforts of the rear wheels provide more efficient stopping power. The subject load sensing and brake proportioning system operates in conjunction with an otherwise conventional braking system including a hydraulic master brake control which generates a brake fluid pressure level for both front and rear brakes. In the subject brake system, a brake proportioning valve is responsive to the degree of vehicle loading.

1. EMBODIMENT ILLUSTRATED IN FIGS. 1 AND 2

An increased load on the vehicle, particularly toward the rearward portion thereof, results in counter-clockwise pivoting of the spring end portion 18 as shown in FIG. 1. Thus, the spring end moves from the solid line position toward the broken line position labeled 30 in FIG. 1. Resultantly, the contact 70 and the associated spring follower mechanism 58 are pivoted counter-clockwise about mounting fastener 60. This moves rubber bumper 106 against wall means 108. Bumper 106 is supported on an extension 110 of lever 58 and is attached thereto by fastener 112. The bumper 106 is molded to form a hollow central portion 114 which facilitates a controlled flattening distortion thereof as the lever pivots counter-clockwise relative to member 54 and wall 108. As the vehicle load is decreased or during a transient flexing (pivoting) of the suspension spring, the bumper 106 tends to bias the lever clockwise to maintain contact between spring 18 and contact 70.

The pivoting of follower lever 58 about the axis of fastener 60 in a counterclockwise direction causes the leftward end portion of lever 58 to elongate spring connector 48. The spring's resultant force is transmitted to the input lever 40 of the proportioning valve 32. As the input force on lever 40 is increased, the fluid pressure directed to the rear brakes is elevated and this produces increased rear braking relative to front braking. Conversely, when follower lever 58 is pivoted clockwise in response to movement from a relatively heavy load position of the spring to a lighter load position, the spring connector 48 inputs a decreased force on lever 40. Resultantly, the proportioning valve 32 produces a pressure level to produce a decreased rear braking relative to front braking.

The spring connector mechanisms illustrated in FIGS. 1–4 use both a strong tension spring in series with a weaker tension spring. One purpose of the weaker spring is to maintain desirable close contact between the contact pad 70 and the surface of spring 12, particularly during transient flexing thereof, such as caused by highway irregularities. It has been found that the ratio of the spring rates for the stronger to the weaker springs in a preferred embodiment is about 5-6 to 1. This appears to be sufficient to maintain desired contact.

2. EMBODIMENT ILLUSTRATED IN FIGS. 6–9

The second embodiment utilizes the same proportioning valve 32 which valve operates essentially in the same manner as described previously. The primary feature of the second embodiment is provided by the particular manner of supporting spring following lever 142 on the reduced diameter portion 146 of the spring end fastener 140. This coaxial arrangement provides coincident angular movements of the spring end 12' and of the follower 142. Resultantly, engagement between the contact surface 200 and the upper surface of spring end 12' is relatively localized without sliding movement therebetween. Likewise, the engagement between the contacting surface of the bulb 214 and the surface of the spring end 12' does not involve relative sliding therebetween the parts. Consequently, there is very little wear.

As the vehicle associated with FIGS. 6–9 is more heavily loaded, the spring end portion 12' moves angularly counter-clockwise toward the solid line position from the broken line position shown in FIG. 6 which is represented by numeral 224. Resultantly, the arm portion 194 of the follower 142 pivots upward and moves the follower 142 about the axis of the fastener 140. This counter-clockwise movement generates an increased force input to the brake proportioner valve 132 via the spring connector 48. During transient flexing of the spring's end portion 12', the spring follower 142 oscillates fairly rapidly about the axis of the fastener 140. This generates alternate compression and relaxation of the weaker spring within the connector assembly 172. The connector assembly 172 shown generally in FIGS. 6 and 7 is the same design as the connectors shown in FIGS. 3 and 4. The relatively weak spring 90 in FIGS. 3 and 4 accommodates this relatively high frequency and low amplitude flexing of the follower mechanism caused by transient conditions such as highway irregularities. Because of coaxial mounting of spring end 12' and follower 142, in association with the cushioning action of the bumper 212, the transient movements of the spring end 12' are tracked accurately without undesirable sliding or scrubbing actions between the contact surfaces 200 and 214 and the surfaces of the spring end 12'.

Although two basic embodiments of the subject improved brake system with a spring follower mechanism have been illustrated and described in detail, modifications thereto are contemplated which fall within the scope of the invention as claimed hereafter.

I claim:

1. In a vehicle, a brake and suspension system including a leaf-type rear spring with at least one end portion attached to a sprung portion of the vehicle for pivotal movements thereabout and with a mid-portion attached to an unsprung rear wheel assembly, a master brake fluid pressure control means for selectively generating desired levels of brake fluid pressure for transmission to brake components associated with each wheel, a proportioning valve means fluidly connected between the master brake control and the rear wheel brake components to regulate the pressure level of brake fluid transmitted to rear brake components and having a force input responsive to loading of the vehicle for controlling the proportioning valve and including an improved vehicle load responsive sensing means, comprising:
- an elongated lever having first and second end portions and a mid-portion;
- means for pivotally mounting both the one end portion of the spring and the mid-portion of the lever in coaxial relation to one another;
- first and second projections extending from the first end portion of the lever, the first projection in spaced overlying relation to one face of the spring's end portion and the second projection in spaced overlying relation to a second face of the spring's end portion;
- spring contact means on the first projection of the lever with a contact surface engaging the one face of the spring's end portion;
- a deformable elastomeric bumper supported by the second projection of the lever and contacting the second face of the spring's end portion;
- the spring contact means and the deformable elastomeric bumper being spaced with respect to one another and contacting the faces of the spring end portion respectively so that the contact surface of the contact means firmly bears against the face of the spring's end portion even as the spring end moves about the pivotal mounting means whereby the common mounting axis of the spring's end portion and the lever permit identical angular movements without sliding contact between the contact surface and the face of the spring's end portion;
- an elongated and yieldable connecting means between the second end portion of the lever and the input of the proportioning valve to generate and transmit a force input to the proportioning valve input in response to angular movements of the spring's end portion and the lever.

2. The load responsive means set forth in claim 1 in which the mounting means for both the spring and the lever takes the form of an elongated cylindrical fastener means anchored at one end to the sprung portion of the vehicle.

3. The load responsive means set forth in claim 2 in which the elongated fastener defines a first portion adjacent the anchored one end engaging the spring end for pivotal support thereof and a second portion axially outward from the vehicle sprung portion and the spring support portion engaging the lever for pivotal support thereof.

4. The load responsive means set forth in claim 2 in which the elongated fastener has a first portion adjacent the anchored one end engaging the spring end for pivotal support thereof and a second portion axially outward from the vehicle sprung portion and of lesser diameter than the first to facilitate assembly of the spring end and lever on the fastener means.

5. In a vehicle, a brake and suspension system of the type including a leaf-type rear spring with at least one end portion attached to a sprung portion of the vehicle for pivotal movements thereabout and with a mid-portion attached to an unsprung rear wheel assembly, a master brake fluid pressure control means for selectively generating desired levels of brake fluid pressure for transmission to brake components associated with each wheel, a proportioning valve means attached to the vehicle's sprung portion adjacent the pivotal mount of the spring's one end and being fluidly connected between the master brake control and the rear wheel brake components to regulate the pressure level of brake fluid transmitted to the rear brake components and further having a force input responsive to loading of the vehicle to control the proportioning valve, an improved vehicle load responsive sensing means, comprising:
- an elongated lever with first and second end portions and a mid-portion;
- an elongated fastener means for pivotally mounting both the one end portion of the spring and the mid-portion of the lever in coaxial and side-by-side relation to one another;
- the fastener means including a bolt with an enlarged head portion supported adjacent the vehicle sprung portion and a first cylindrical body portion extending away from the head portion and the vehicle sprung portion to support the one end of the spring, the fastener means including an axially adjustable nut operably engaging the bolt to secure the one end of the spring on the first cylindrical portion, the bolt having a second cylindrical portion of smaller diameter than the first cylindrical portion for supporting the mid-portion of the lever in coaxial relation to the one end of the spring;
- spring contact means supported by the first end portion of the lever with a contact surface thereof engaging the one end portion of the spring and pivotally movable in response to pivotal movements of the spring without sliding movements between the spring and the contact surface;
- an elongated and yieldable connecting means between the second end portion of the lever and the input of the proportioning valve to generate and transmit a force input to the proportioning valve input in response to common angular movements of the spring's end portion and the lever.

6. The improved load sensing means of claim 5, in which the first end portion of the lever has a pair of projections extending in spaced parallelism to each other and each extending in spaced overlying relationship to one of the opposite faces of the one end portion of the spring, and both of the projections supporting spring contact means.

7. The improved load sensing means of claim 6, in which one of the spring contact means is relatively deformable relative to the associated supporting projection caused by relative spacing thereof with respect to the one end portion of the spring and the spring contact means are adjustably movable in relation to each other and the spring to provide a desired continuous contact therebetween with the spring end portion.

* * * * *